United States Patent
Kozo

(10) Patent No.: US 9,685,850 B2
(45) Date of Patent: Jun. 20, 2017

(54) VOICE COIL MOTOR AND DIRECT-ACTING SERVO VALVE USING THE VOICE COIL MOTOR

(71) Applicant: SANTEST CO., LTD., Osaka (JP)

(72) Inventor: Kyoizumi Kozo, Osaka (JP)

(73) Assignee: SANTEST CO., LTD., Osaka (JP)

( * ) Notice: Subject to any disclaimer, the term of this patent is extended or adjusted under 35 U.S.C. 154(b) by 94 days.

(21) Appl. No.: 14/753,118

(22) Filed: Jun. 29, 2015

(65) Prior Publication Data

US 2016/0218610 A1    Jul. 28, 2016

(30) Foreign Application Priority Data

Jan. 22, 2015  (JP) .................................. 2015-009913
Mar. 18, 2015  (JP) .................................. 2015-054272

(51) Int. Cl.
*F16K 31/02*   (2006.01)
*H02K 41/035*  (2006.01)
(Continued)

(52) U.S. Cl.
CPC ........ *H02K 41/0356* (2013.01); *F16K 11/065* (2013.01); *F16K 31/04* (2013.01); *H02K 33/18* (2013.01); *H02K 7/14* (2013.01)

(58) Field of Classification Search
CPC ...... F16K 31/082; F16K 11/065; F16K 31/04; H02K 41/031; H02K 41/0356; H02K 33/18; H02K 7/14
(Continued)

(56) References Cited

U.S. PATENT DOCUMENTS 5,200,729 A * 4/1993 Soeda .................. H01F 7/021
                                                    335/284
5,959,374 A * 9/1999 Anderson ............ H02K 41/031
                                                    310/13
(Continued)

FOREIGN PATENT DOCUMENTS

JP         62-92757 A      4/1987
JP      2003-333823 A     11/2003
(Continued)

OTHER PUBLICATIONS

English language machine translation of JP2010-104136A (retrieved from EPO website on Nov. 28, 2016).*
(Continued)

*Primary Examiner* — Jessica Cahill
(74) *Attorney, Agent, or Firm* — Westerman, Hattori, Daniels & Adrian, LLP

(57) ABSTRACT

A voice coil motor 2 using a Dual Halbach Magnet Array has an outer magnet array 5 and an inner magnet array 6, wherein the inner magnet array 6 comprises axially magnetized magnets 6A, 6C and 6E and radially magnetized magnets 6B and 6D. Each of the axially magnetized magnets 6A, 6C and 6E of an inner magnet array 6 is formed of a monolithic magnet having ring-shape, whereas each of the radially magnetized magnets 6B and 6D of the inner magnet array 6 is formed of a plurality of split magnets divided in a circumferential direction. A fixing means 13 is provided to fix the radially magnetized magnets 6B and 6D and the axially magnetized magnets 6A, 6C and 6E of the inner magnet array 6 in an axially clamped manner.

18 Claims, 7 Drawing Sheets

(51) Int. Cl.
*F16K 11/065* (2006.01)
*F16K 31/04* (2006.01)
*H02K 33/18* (2006.01)
*H02K 7/14* (2006.01)

(58) Field of Classification Search
USPC ........................................................ 251/905
See application file for complete search history.

(56) References Cited

U.S. PATENT DOCUMENTS

| | | | | |
|---|---|---|---|---|
| 6,313,551 | B1* | 11/2001 | Hazelton | H02K 41/03 |
| | | | | 310/12.24 |
| 7,159,842 | B1* | 1/2007 | Taylor | F16K 31/082 |
| | | | | 251/129.13 |
| 7,368,838 | B2 | 5/2008 | Binnard et al. | |
| 8,446,054 | B2* | 5/2013 | Toyota | H02K 41/031 |
| | | | | 310/12.24 |
| 2015/0228417 | A1* | 8/2015 | Maruyama | H01H 33/38 |
| | | | | 335/187 |

FOREIGN PATENT DOCUMENTS

| | | |
|---|---|---|
| JP | 2010-104136 A | 5/2010 |
| JP | 2010-154688 A | 7/2010 |
| JP | 2012-57776 A | 3/2012 |
| JP | 2013-215021 A | 10/2013 |

OTHER PUBLICATIONS

Notification of Reasons for Rejection dated Aug. 4, 2015, issued in counterpart Japanese Patent Application No. 2015-054272 (3 pages).

* cited by examiner

--Prior Art--

VOICE COIL MOTOR AND DIRECT-ACTING SERVO VALVE USING THE VOICE COIL MOTOR

FIELD OF THE INVENTION

The present invention relates to a voice coil motor and a direct-acting servo valve using the voice coil motor.

BACKGROUND OF THE INVENTION

A voice coil motor, as is well known, comprises cylindrical magnets, an outer yoke and an inner yoke. The voice coil motor also comprises a cylindrical coil that is arranged in an annular space in which magnetic field is intensively generated, such that the coil is driven in an axial direction when current is supplied to the coil. Direct-acting (linear driving) servo valves using such voice coil motors are known to public. The direct-acting servo valve drives a spool placed in a valve body in an axial direction by means of the voice coil motor, and switches the communication between ports provided on the valve body by opening and closing the ports. As a result, the flow rate of fluid flowing through the ports is regulated, and velocity, position or forces of a loading device such as a hydraulic cylinder or a fluid motor are controlled. Servo valves are used in various machines and equipment such as pressing machines, machine tools, steel manufacturing facilities, airplanes or fatigue testing machines which require quick response as well as relatively large power.

The document D1 discloses a structure in which voice coil motors including yokes having E-shape in their vertical sections (see FIG. 3 in the document D1) are placed on both axial ends of a spool so as to enhance the axial driving force to the spool. By providing two voice coil motors, the driving force to the spool may be doubled. However, because total mass of these voice coil motors is also doubled, this case may result in a deteriorated responsiveness in some degree. Further, because two amplifiers are necessary for driving the voice coil motors, a problem of increased cost in addition to the problem of increased heat generation caused by the voice coil motors may occur.

It is possible to provide a voice coil motor as disclosed in the documents D2 and D3 on one end of the spool. Such a voice coil motor uses a magnetic circuit that is generally called as "Dual Halbach Magnet Array" by which driving magnetic field of the voice coil motor can be increased so as to generate larger driving force to drive the spool in an axial direction. In these cases, only a single voice coil motor is necessary, leading to improved speed response, and furthermore, only a single amplifier being required. The structure of the voice coil motor using a Dual Halbach Magnet Array, which enhances interacting magnetic field for the coil so as to improve the drive efficiency, is already well known by the documents D4, D5 and D6 in addition to the documents D2 and D3.

A voice coil motor using a Dual Halbach Magnet Array is shown in FIG. 11 in principle. In a Dual Halbach Magnet Array, a cylindrical coil 120 is arranged in an annular space between an outer magnet array 100 and an inner magnet array 110, such that the coil 120 becomes movable in axial directions to the left or to the right depending on the alternative direction of the current supplied to the coil 120. The outer magnet array 100 is configured by axially arranging ring-shaped radially magnetized magnets 101 and ring-shaped axially magnetized magnets 102 to be adjacent to each other in a manner that magnetic poles of the radially magnetized magnets 101 and the axially magnetized magnets 102 are rotated by 90 degrees to each other in a cross section including center axes. An inner magnet array 110 is configured by axially arranging ring-shaped radially magnetized magnets 111 having the same direction of magnetic poles as the radially magnetized magnets 101 of the outer magnet array 100, and ring-shaped axially magnetized magnets 112 whose magnetic poles have reverse directions with respect to the axially magnetized magnets 102 of the outer magnet array 100. An outer periphery of the outer magnet array 100 is supported by an outer cylindrical member 105, and an inner periphery of the inner magnet array 110 is supported by an inner cylindrical member 115. The reference numeral 121 denotes a coil bobbin, whereas the reference numerals 125 and 126 denote side plates.

The ring-shaped axially magnetized magnets 102 and 112 can be manufactured easily by the conventional technology. However, it is difficult to manufacture the ring-shaped magnets 101 and 111 which are radially magnetized in a favorable manner. This is because it is difficult to magnetize a ring-shaped magnet such that it has effective and high magnetic flux density in its radial direction due to the difference between the area of the inner peripheral surface and that of the outer peripheral surface of the ring-shaped magnet. Particularly, in case there is a large difference between the inner and outer diameters, it is more difficult to radially magnetize the ring-shaped magnet effectively.

As one way to cope with this difficulty, a magnetic ring (not magnetized yet) may be divided in its circumferential direction into a plurality of parts, and then each of the parts may be magnetized in its radial direction. Thereafter, all of the radially magnetized parts may be combined into a ring to form a radially magnetized magnet. It is relatively easy to radially magnetize the parts individually even with the conventional technology. In this way, if the magnetized parts are combined into a ring, it may be possible to manufacture the radially magnetized magnet having effective and high magnetic flux density in its radial direction.

An adhesive may be considered to be used in order to combine the plurality of split magnets into a ring-shape. However, since inner and outer peripheries of the split magnets adjacent in their circumferential directions have the same polarity respectively, repulsive force always acts therebetween. Thus, the adhesive tends to be broken due to disturbances such as changes in ambient temperature or vibration, so that the split magnets may possibly pop outwardly in the radial direction. Consequently, the radially magnetized magnets may not be able to work anymore.

Split-type radially magnetized magnet may be applicable for both of the outer magnet array 100 and the inner magnet array 110. Regarding the outer magnet array 100, the split magnets will not pop outwardly since their outer peripheral surfaces are surrounded by the outer cylindrical member 105. Further, since both circumferential sides of each of the split magnets have radially inclined surfaces, those inclined surfaces will act as wedges so as to prevent the split magnets from popping inwardly. Regarding the inner magnet array 110, the split magnets cannot pop inwardly since the inner peripheral surface thereof are supported by the inner cylindrical member 115. However, the split magnets cannot be prevented from popping outwardly because their outer peripheral surfaces are not supported in surrounding manner. If a split magnet pops outwardly, it may interfere with the coil, resulting in a failure in the operation of the voice coil motor.

PRIOR ART DOCUMENTS

[Patent Document D1]
Japanese Patent Application Publication No. 2012-57776 A
[Patent Document D2]
Japanese Patent Application Publication No. 2010-154688 A
[Patent Document D3]
Japanese Patent Application Publication No. 2013-215021 A
[Patent Document D4]
Japanese Patent Application Publication No. 1987-092757 A
[Patent Document D5]
Japanese Patent Application Publication No. 2003-333823 A
[Patent Document D6]
U.S. Pat. No. 7,368,838

SUMMARY OF INVENTION

Problem to be Solved by the Invention

The object of the present invention is to provide a voice coil motor having high magnetic efficiency in which radially magnetized magnets of an inner magnet array can be prevented from popping out, and to provide a direct-acting servo valve using the voice coil motor.

Means for Solving Problem

A voice coil motor of the present invention comprises an outer magnet array, an inner magnet array, an outer cylindrical member for supporting an outer periphery of the outer magnet array, an inner cylindrical member for supporting an inner periphery of the inner magnet array, a side member for connecting at least one axial end of the outer cylindrical member and that of the inner cylindrical member, and a coil. The outer magnet array is constructed by arranging radially magnetized magnets of ring-shape and axially magnetized magnets of ring-shape to be axially adjacent to each other in a manner that magnetic poles of the radially magnetized magnets and the axially magnetized magnets are altered by substantially 90 degrees in a cross-section including a center axis of the outer magnet array. The inner magnet array is constructed by arranging radially magnetized magnets of ring-shape and axially magnetized magnets of ring-shape to be axially adjacent to each other, the radially magnetized magnets having magnetic poles which are directed in the same directions as those of the outer magnet array, and the axially magnetized magnets having magnetic poles which are directed in directions opposite to those of the outer magnet array. The coil is arranged axially movably in an annular space between the outer magnet array and the inner magnet array to be actuated axially when current is supplied to the coil. Each of the axially magnetized magnets of the inner magnet array is formed of a monolithic magnet having ring-shape, and each of the radially magnetized magnets of the inner magnet array is formed of a plurality of split magnets divided in a circumferential direction. A fixing means is provided to fix the radially magnetized magnets and the axially magnetized magnets of the inner magnet array in an axially clamped manner.

In the present invention, a monolithic ring-shaped magnet is used as an axially magnetized magnet of the inner magnet array, while a plurality of split magnets divided in a circumferential direction are used as a radially magnetized magnet of the inner magnet array. Since the split magnets forming the radially magnetized magnet repel each other, the split magnets pop outwardly in the radial direction when the adhesion part is broken due to change in temperature or vibration. Thus, in the present invention, a fixing means is provided to fix the radially magnetized magnets and the axially magnetized magnets of the inner magnet array in an axially clamped manner. Since the radially magnetized magnet formed of the split magnets and the axially magnetized magnet formed of a monolithic ring-shaped magnet are clamped axially, the split magnets can be prevented from popping outwardly. Therefore, the radially magnetized magnet having high magnetic flux density in a radial direction can be implemented. The split magnets are not necessarily joined to each other by an adhesive. In this specification, "magnet" refers to a permanent magnet.

Inclined surfaces may be formed on at least one axial side of the split magnets, and a wedge-shaped ring having a larger thickness at its outer peripheral portion than that at its inner peripheral portion may be positioned between the inclined surfaces of the split magnets and an opposing surface of an axially magnetized magnet. Thus, the split magnets are biased inwardly in the radial direction due to an axial clamping force of the fixing means. In this case, the axial clamping force and the inclined surfaces cooperate to generate the force for biasing the split magnets inwardly in the radial direction, thereby preventing the split magnets from popping outwardly in the radial direction further effectively. The wedge-shaped ring may be formed of non-magnetic material as well.

Further, inclined surfaces may be formed on at least one axial side of the split magnets, and a tapered surface with an inclination corresponding to the inclined surfaces may be formed on an opposing surface of one of the axially magnetized magnet which is contacting with the inclined surfaces of the split magnets, such that the split magnets are biased inwardly in the radial direction due to an axial clamping force of the fixing means. In this case also, the axial clamping force, the inclined surfaces and the tapered surface cooperate to generate the force for biasing the split magnets inwardly in the radial direction, thereby preventing the split magnets from popping outwardly in the radial direction effectively.

Further, the voice coil motor may comprise a non-magnetic tube which continuously surrounds the outer peripheries of the radially magnetized magnets and the axially magnetized magnets of the inner magnet array. The split magnets forming the radially magnetized magnet of the inner magnet array can be prevented from popping outwardly in the radial direction effectively by using this non-magnetic tube as well. Because the tube is non-magnetic, it will not disturb the magnetic field generated by the radially magnetized magnet and the axially magnetized magnet.

The fixing means may comprise a flange part provided on an axial end portion of the inner cylindrical member to stop an axial end of the inner magnet array, a threaded portion formed on the other axial end portion of the inner cylindrical member, and a threaded fastener to be engaged with the threaded portion for pressing the other axial end of the inner magnet array. When the threaded fastener is tightened, the inner magnet array is clamped in the axial direction between the flange part and the threaded fastener. In this case, the inner magnet array can be clamped strongly enough due to the tightening power of the fastener to prevent the split magnets from popping out. In this description, "flange part"

refers to a part which stops an axial end of the inner magnet array. The flange part may be integrally formed on the outer periphery of an axial end portion of the inner cylindrical member, or may be formed of an individual part, such as a snap-ring, which is attached to the outer periphery of the inner cylindrical member. When the side member is integrally formed with the inner cylindrical member, the side member may also serve as the flange part. The "threaded portion" formed on the other axial end portion of the inner cylindrical member may be external thread or internal thread. The "fastener" means a threaded component, such as a nut or a bolt, to be engaged with the threaded portion. When the side member is formed as a different component from the inner cylindrical member, the side member may also serve as a threaded fastener.

Further, the fixing means may comprise a flange part provided on an axial end portion of the inner cylindrical member to stop an axial end of the inner magnet array, a shank portion having external thread on the other axial end of the inner cylindrical member, a through hole formed in the side member to be inserted by the shank portion, and a threaded fastener to be engaged with the external thread of the shank portion. When the threaded fastener is tightened, the inner magnet array and the side member are axially clamped between the flange part and the threaded fastener. In this case, since the threaded fastener works as a fixing means for axially clamping the inner magnet array so as to prevent the split magnets from popping out, and as a fixing means for fixing the inner cylindrical member to the side member, the structure of the voice coil motor can be simplified and downsized. The shank portion may be a solid shank or a hollow shank.

The outer cylindrical member, the inner cylindrical member and the side member may be formed of magnetic material respectively such that a continuous magnetic path from the outer cylindrical member to the inner cylindrical member via the side member is formed. In this case, the magnetic efficiency can be improved in comparison to a case in which the outer cylindrical member and the inner cylindrical member are formed of the non-magnetic material, thereby an axial driving force of the coil can be increased without increasing the current supplied to the coil.

A voice coil motor having the Dual Halbach Magnet Array as described above may be applied to a direct-acting servo valve. Namely, the direct-acting servo valve may comprise the above described voice coil motor, a valve body having a plurality of ports, and a spool positioned in the valve body movably in an axial direction. The spool is axially driven by the voice coil motor to switch the connection path between the ports. In this case, since the driving magnetic field of the voice coil motor can be intensified, a single voice coil motor may be enough for the servo valve, resulting that the spool is improved in its transient response and increased in its driving force.

When the above described voice coil motor is applied to a servo valve, a detection magnet may be fixed on an axial end of the spool, and a hall device and a coil element for detecting displacement and velocity of the spool may be located at a stationary position in the vicinity of the detection magnet to output detected signals as feedback signals. In the prior art, the displacement of the spool is often detected by a differential transformer or a potentiometer. In order to obtain a velocity of the spool, it was necessary to differentiate the displacement signal, resulting that an electrical noise caused by the differentiation could not be ignored. In contrast, when the velocity signal is obtained by the coil while a displacement signal is obtained by the hall device, the velocity of the spool can be detected without the influence by the noise, leading to an improvement of the spool in its response.

Advantageous Effects of the Invention

As described above, according to the present invention, an axially magnetized magnet of an inner magnet array is formed of an monolithic ring-shaped magnet, a radially magnetized magnet of the inner magnet array is formed of a plurality of split magnets which are divided in a circumferential direction, and a fixing means is arranged to fix the radially magnetized magnet and the axially magnetized magnet of the inner magnet array in an axially clamped manner. In this way, the split magnets can be prevented from popping outwardly even though the split magnets placed adjacently in the circumferential direction repel each other. Therefore, a voice coil motor having a high magnetic efficiency and a high endurance can be created.

DESCRIPTION OF EMBODIMENTS

First Embodiment

Figure 1:
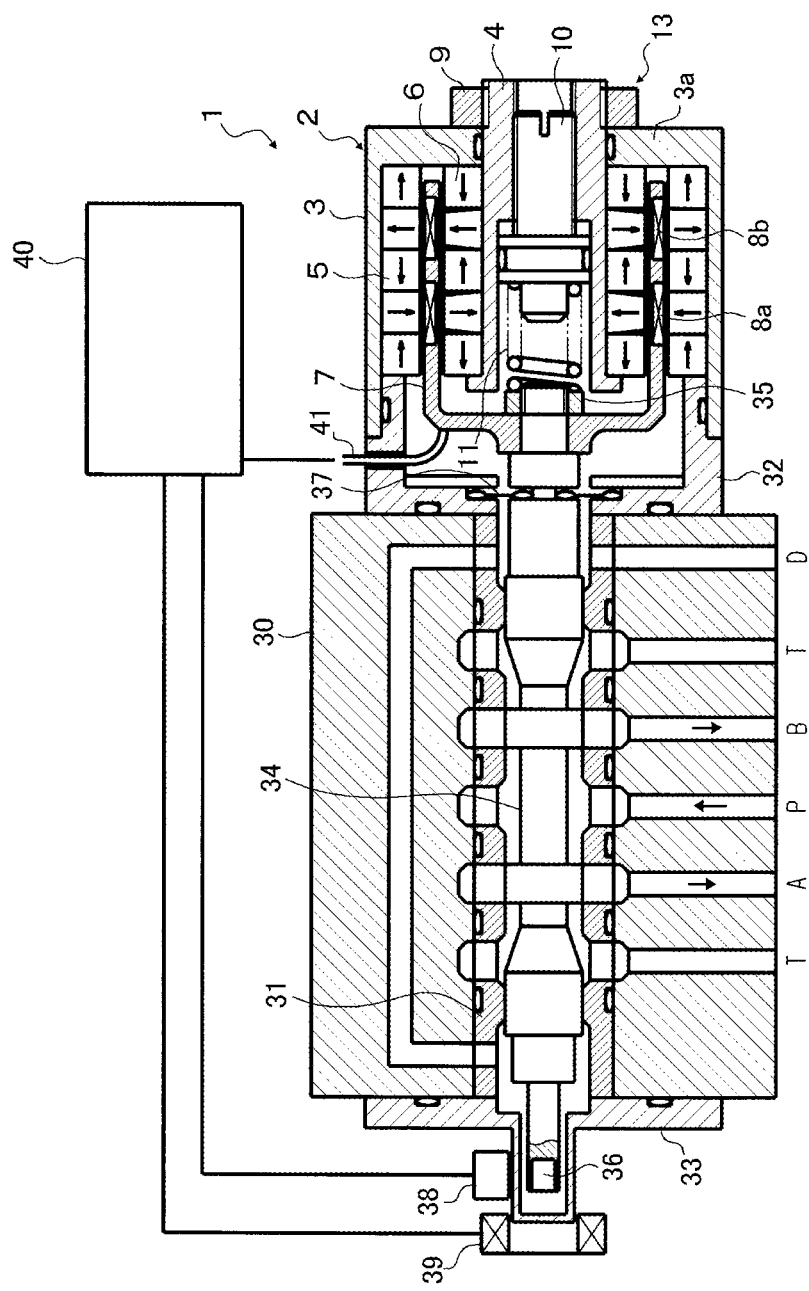
FIG. 1 is a cross-sectional view of a direct-acting servo valve having a voice coil motor according to a first embodiment of the present invention.

FIG. 1 shows a direct-acting servo valve 1 using a voice coil motor 2 according to a first embodiment of the present invention. With respect to the voice coil motor 2, detailed description will be given referring to FIG. 2, and only brief description of the functions of the representative components thereof will be given regarding FIG. 1. A sleeve 31 is inserted into the middle of valve body 30 of the servo valve 1, and the sleeve 31 is fixed by side plates 32 and 33 provided on both axial ends of the valve body 30.

A spool 34 is inserted in a center of the sleeve 31 in axially movable manner. An axial end portion of the spool 34 is fixed to a coil bobbin 7 of a voice coil motor 2 (as described below) by a nut 35, and the other axial end portion of the spool 34 is provided with a magnet 36 attached thereto. FIG. 1 shows the spool 34 in a state in which it is neutrally positioned with respect to the sleeve 31. The pressurized fluid (e.g. hydraulic oil) supplied in an inlet port P, which is provided in the valve body 30, cannot flow through an outlet port A nor an outlet port B connected to a loading device such as a hydraulic cylinder (not shown). For example, when the spool 34 is driven to a right-hand side from the neutral position, the pressurized fluid supplied in the port P flows through the port B, such that the fluid drives the loading device such as the hydraulic cylinder, and the returning fluid from the loading device reaches a tank port T through the port A. When the spool 34 is driven to a left-hand side from the neutral position, the pressurized fluid will flow in the reverse direction.

A drain port D is provided so as not to raise the pressure acting on both sides of the spool 34. The drain port D may preferably be released in the atmosphere, or may be connected to the tank port T. A diaphragm 37 is provided to prevent the fluid leaking into the drain port D from entering into the voice coil motor 2. Thus, the diaphragm 37 may be omitted if the fluid is allowed to enter into the voice coil motor 2.

A hall device 38 for detecting a displacement and a coil element 39 for detecting velocity are fixed in the vicinity of the side plate 33, which is fixed on the left-hand side of the valve body 30. Since the magnet 36 is fixed on the left end portion of the spool 34 as described above, the displacement of the spool 34 can be detected by the hall device 38 in non-contact manner. In addition, the velocity of the spool 34 can be directly detected by the coil element 39 in non-contact manner using the principle of a tachometer.

The displacement signals and the velocity signals detected by the hall device 38 and the coil element 39 are fed back to a controller 40. The controller 40 also has a role of supplying current to coils 8a and 8b of the voice coil motor 2 via the lead wires 41. Since a circuit of the controller 40 can be easily designed by prior arts, the description of the circuit is omitted here. According to the prior art, the displacement of the spool 34 is usually detected by a differential transformer or a potentiometer. When the velocity of the spool 34 is required, one has no choice but to differentiate the displacement signal, resulting that an electrical noise caused by the differentiation could not be ignored. In contrast, according to the servo valve 1 as shown in FIG. 1, since the velocity signal is obtained by the coil element 39 in addition to the displacement signal by the hall device 38, the velocity of the spool 34 can be detected without the influence of the noise, leading to an improved response of the spool 34. When necessary, one can easily obtain the acceleration signal by differentiating the velocity signal, leading to a further improvement of the spool 34 in its response.

Figure 2:
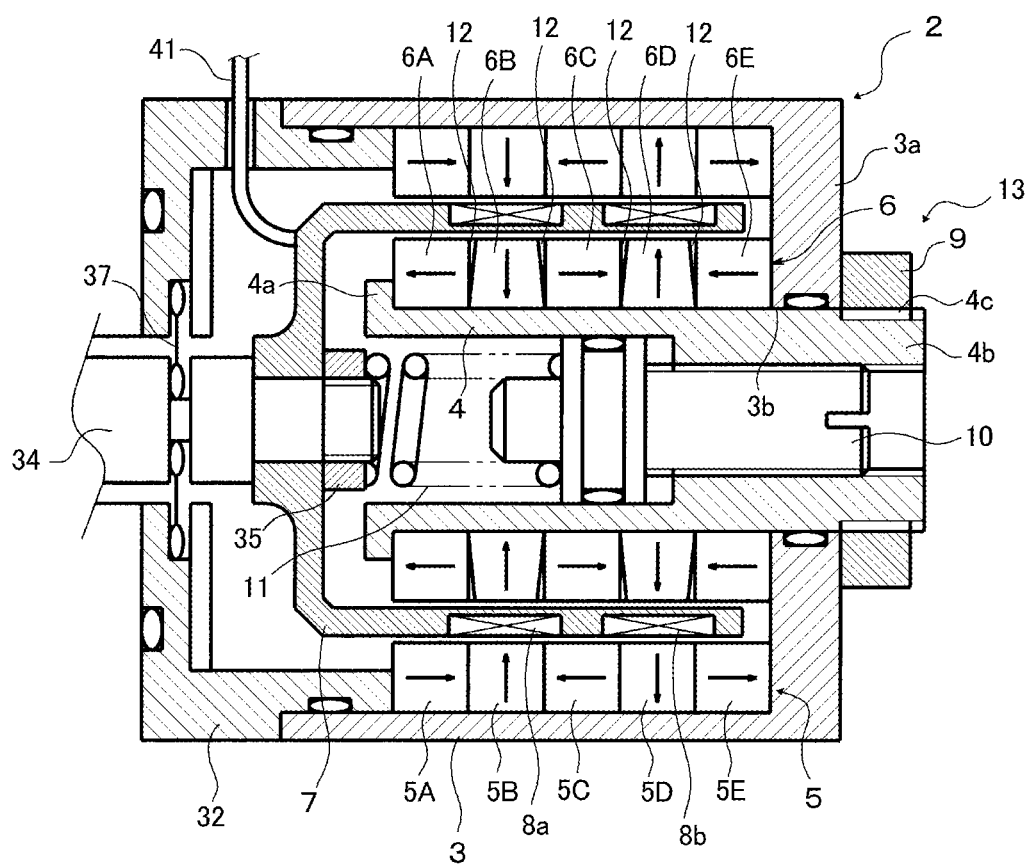
FIG. 2 is an enlarged cross-sectional view of a voice coil motor shown in FIG. 1.

FIG. 2 is an enlarged view of the voice coil motor 2. The same numerical references designate the same components as those in FIG. 1. The voice coil motor 2 includes an outer cylindrical member 3, which serves as a housing as well. The outer cylindrical member 3 and the side plate 32 are connected to each other, and fixed on one side surface of the valve body 30. An inner cylindrical member 4 is arranged inside of the outer cylindrical member 3, such that the inner cylindrical member 4 and the outer cylindrical member 3 are supported coaxially via a side member 3a. The side member 3a of this example is integrally formed with the outer cylindrical member 3 at its one axial end (right-hand side of FIG. 2). An outer magnet array 5 is arranged on the inner peripheral surface of the outer cylindrical member 3, and an inner magnet array 6 is arranged on the outer peripheral surface of the inner cylindrical member 4. As described below, the inner magnet array 6 is assembled in the inner cylindrical member 4, and is fastened to the outer cylindrical member 3 (side member 3a) by a nut 9 as a fastener. A coil bobbin 7 is inserted in an annular space formed between the outer magnet array 5 and the inner magnet array 6 in an axially movable manner.

The inner cylindrical member 4 and the outer cylindrical member 3 can be formed of non-magnetic or magnetic material. However, according to the experiments carried out by the inventor, when magnetic material is used for both of the inner cylindrical member 4 and the outer cylindrical member 3 (including the side member 3a), the thrust force is 18.2% higher compared to the case in which non-magnetic material is used. Therefore, it is preferable to use magnetic material for the outer cylindrical member 3 and the inner cylindrical member 4 in order to increase magnetic efficiency. In this case, the outer cylindrical member 3 and the inner cylindrical member 4 act as the so-called magnetic yoke. However, in a case where lighter weight is more important than magnetic efficiency, the outer cylindrical member 3 and the inner cylindrical member 4 may be formed of non-magnetic material.

The coils 8a and 8b, which are connected in series and whose winding directions are opposite to each other, are arranged on the coil bobbin 7 with a predetermined axial interval therebetween. The both ends of the coils 8a and 8b are connected to the lead wires 41. The coil bobbin 7 is driven to the left and right depending on the direction of the current flowing in the lead wires 41, and the spool 34 is also driven in an axial direction accordingly. The center distance between the two coils 8a and 8b are set approximately equal to a distance in an axial direction of the radially magnetized magnets as described later. Although two coils 8a and 8b whose winding directions are opposite to each other are arranged on the coil bobbin 7 in this embodiment, one coil or more than two coils may also be used.

A spring-stopping screw 10 is engaging with the inner periphery of the inner cylindrical member 4. A coil spring 11 is deposited between a nut 35 for fixing the coil bobbin 7 to the above described spool 34, and the spring-stopping screw 10. An axially neutral position of the coil bobbin 7, namely an axially neutral position of the spool 34, is adjusted by the coil spring 11 and the screw 10. The screw 10 may be adjusted from outside with a tool. At the neutral position of the coil bobbin 7, the two coils 8a and 8b are positioned between the radially magnetized magnets of the outer magnet array 5 and the inner magnet array 6. At the neutral position of the spool 34, both of outlet ports A and B are almost closed by land portions of the spool 34. It should be noted that the axial neutral position of the coil bobbin 7 need not to coincide with that of the spool 34.

The outer magnet array 5 is constructed by arranging a plurality of ring-shaped magnets 5A to 5E in an axially superposed manner. An arrow indicated in each magnet shows magnetization direction, and a tip of the arrow shows the n-pole. As a matter of course, the number of superposition of the ring-shaped magnets is not limited to five. The ring-shaped magnets 5A, 5C and 5E are magnetized in a thickness direction, namely in an axial direction of the ring-shaped magnets. On the other hand, the ring-shaped magnets 5B and 5D are magnetized in a radial direction. Specifically, the magnet 5B is magnetized with n-pole being directed toward the center, while the magnet 5D is magnetized with n-pole being directed toward the outer periphery.

Similarly to the case of the outer magnet array 5, the inner magnet array 6 is also constructed by arranging a plurality of ring-shaped magnets 6A to 6E in an axially superposed manner. An arrow indicated in each magnet shows magnetization direction, and a tip of the arrow shows the n-pole. The ring-shaped magnets 6A, 6C and 6E are magnetized in a thickness direction, namely in an axial direction of the ring-shaped magnets. On the other hand, the ring-shaped magnets 6B and 6D are magnetized in a radial direction. Specifically, the magnet 6B is magnetized with n-pole being directed toward the center, while the magnet 6D is magnetized with n-pole being directed toward the outer periphery.

Each of the outer magnet array 5 and the inner magnet array 6 is, so called, a typical "Halbach Magnet Array", and those magnet arrays which are assembled coaxially may be called "Dual Halbach Magnet Array". In the description below, the magnets 5A, 5C, 5E, 6A, 6C and 6E which are magnetized in a thickness direction are called as axially magnetized magnets, and the magnets 5B, 5D, 6B and 6D which are magnetized in a radial direction are called as radially magnetized magnets.

As described above, the coil bobbin 7 is inserted into the annular space formed between the outer magnet array 5 and the inner magnet array 6 in an axially movable manner. The coil bobbin 7 is driven to the left or to the right depending on a direction of the current flowing in the coils 8a and 8b. In the neutral position of the coil bobbin 7, the coil 8a is positioned in the vicinity of the space between the radially magnetized magnets 5B and 6B, while the other coil 8b is positioned in the vicinity of the space between the radially magnetized magnets 5D and 6D. Since the winding directions of the coils 8a and 8b are opposite to each other, the inductance is decreased and the responsiveness is improved. Further, the thrust force in an axial direction of the coil bobbin 7 may be approximately twice as large as that in the case of using one coil.

Regarding the magnetic field existing in the annular space between the outer magnet array 5 and the inner magnet array 6, due to the effect of the above described "Dual Halbach Magnet Array", the magnetic field generated in the space between the radially magnetized magnets 5B, 5D, 6B and 6D can be intensively enhanced such that the magnetic flux density acting on the coils 8a and 8b is increased. According to the magnetic analysis simulation carried out by the inventor, the magnetic circuit of the present embodiment could attain approximately 2.3 times stronger magnetic flux density at the magnetic pole center in comparison to a yoke of the same size having E-shape in its vertical section.

Meanwhile, as already described above, it is easy to manufacture a ring-shaped axially magnetized magnet using the current technology, whereas it is difficult to manufacture a ring-shaped radially magnetized magnet. Thus, a plurality of split magnets as divided in circumferential direction are adhered into one ring. However, in case the adhesive is broken due to e.g. changes in ambient temperature or vibration, the split magnets might pop outwardly. Especially, the above problem becomes apparent when the split magnets are used as the radially magnetized magnets 6B and 6D of the inner magnet array 6.

Figure 3:
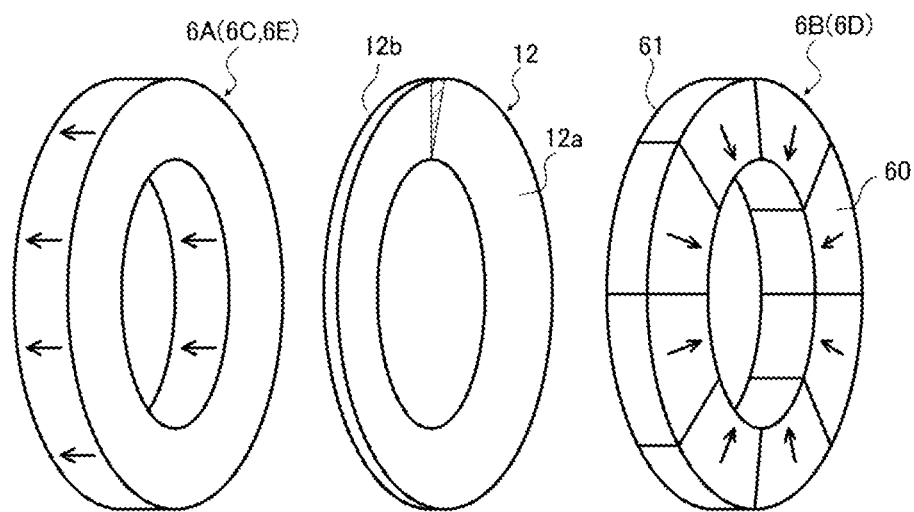
FIG. 3 is a perspective view of parts of an inner magnet array of a voice coil motor shown in FIG. 1.
Figure 4:
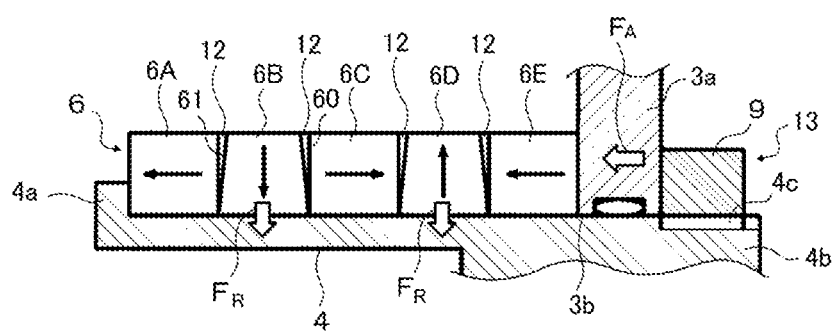
FIG. 4 shows a principle according to which a radially inward-directed component force is generated in split magnets due to tightening force of a fastener.

In the first embodiment, as shown in FIGS. 3 and 4, each of the radially magnetized magnets 6B and 6D of the inner magnet array 6 is formed of a plurality of split magnets, which are fixed into a ring-shape by an adhesive. Although the radially magnetized magnets 6B and 6D consist of eight split magnets in FIG. 3 respectively, the number of split magnets is not limited to eight, and any appropriate number of split magnets can be employed for one radially magnetized magnet as far as they can be effectively magnetized. Each of the split magnets of the radially magnetized magnets 6B and 6D has inclined surfaces 60 and 61 on both sides in an axial direction in such a way that its axial cross section has a shape of trapezoid whose upper base is shorter than the bottom base. In addition, a wedge-shaped ring 12 which has larger thickness at its outer diameter than that at its inner diameter is placed between the inclined surfaces 60 and 61 of the split magnets 6B and 6D, and the opposing surfaces of the axially magnetized magnets 6A, 6C and 6E. The inner diameter and the outer diameter of the wedge-shaped ring 12 may be approximately the same as those of the inner magnet array 6. The wedge-shaped ring 12 may have a tapered surface 12a at a side facing to the radially magnetized magnet 6B or 6D, whereas the wedge-shaped ring 12 may have a side surface 12b which is vertical with respect to the center axis at a side facing to the axially magnetized magnet 6A, 6C or 6E. Alternatively, the wedge-shaped ring 12 may have a shape of triangle or trapezoid in its cross-section. The wedge-shaped ring 12 may preferably be formed of non-magnetic material. As a matter of course, although the axially magnetized magnets 6A, 6C and 6E have a rectangular shape in their axial cross-sections, they may have a shape of trapezoid whose upper base is shorter than the bottom base, which is similar to the split magnets 6B and 6D. In this case, the wedge-shaped ring 12 should have tapered surfaces on both axial sides thereof.

Regarding the outer magnet array 5, since the split magnets cannot pop outwardly, the axially magnetized magnets 5A, 5C and 5E, as well as the radially magnetized magnets 5B and 5D, may have a rectangular shape in their axial cross-sections, just like the conventional case.

Further, a fixing means 13 is arranged with the inner cylindrical member 4 in order to fix the radially magnetized magnets 6B and 6D as well as the axially magnetized magnets 6A, 6C and 6E of the inner magnet array 6 in an axially clamped manner. In this embodiment, the fixing means 13 includes a circular flange part 4a which is formed at the left end portion of the outer periphery of the inner cylindrical member 4 in order to stop the left end of the inner magnet array 6. The fixing means 13 further includes a shank portion 4b which has an external thread 4c on its outer peripheral surface and which is formed at the right end portion of the inner cylindrical member 4, and a nut (threaded fastener) 9 which engages with the external thread 4c. The shank portion 4b of the inner cylindrical member 4 is inserted into the through hole 3b of the side member 3a, and then the nut 9 is engaged with the external thread 4c of the shank portion 4b protruding outwardly from the side member 3a, so that both axial ends of the inner magnet array 6 are pressed to be fixed by the flange part 4a and the side member 3a. Because the through hole 3b is formed coaxially with the outer cylindrical member 3, the inner cylindrical member 4 is coaxially fixed to the outer cylindrical member 3 accurately. In this embodiment, the nut 9 serves both as a fastener to axially fix the inner magnet array 6 in a clamped manner, and as a fastener to fix the inner cylindrical member 4 to the outer cylindrical member 3 (side member 3a). However, the nut 9 may be replaced by individual fasteners.

The split magnets 6B and 6D are biased inwardly in radial direction due to the interaction of the axial clamping force generated by the fixing means 13, the inclined surfaces 60 and 61 of the split magnets 6B and 6D, and the tapered surface 12a of the wedge-shaped ring 12. In FIG. 4, a force $F_A$ represents a pressing force in the axial direction generated by the fixing means 13, and a force $F_R$ represents a force applied to the split magnets 6B and 6D inwardly in radial direction. As described above, because axially superposed magnets 6A to 6E and four wedge-shaped ring 12 are tightly fixed in the axial direction due to the clamping force $F_A$ of the fixing means 13, the split magnets 6B and 6D can be prevented from popping outwardly even when the adhesive is broken. In addition, because the radially inward force $F_R$ acts on the split magnets 6B and 6D due to the inclined surfaces 60 and 61 of the split magnets 6B and 6D and the tapered surface 12a of the wedge-shaped ring 12, the split magnets 6B and 6D are prevented from popping outwardly even more effectively.

The Second Embodiment

Figure 5:
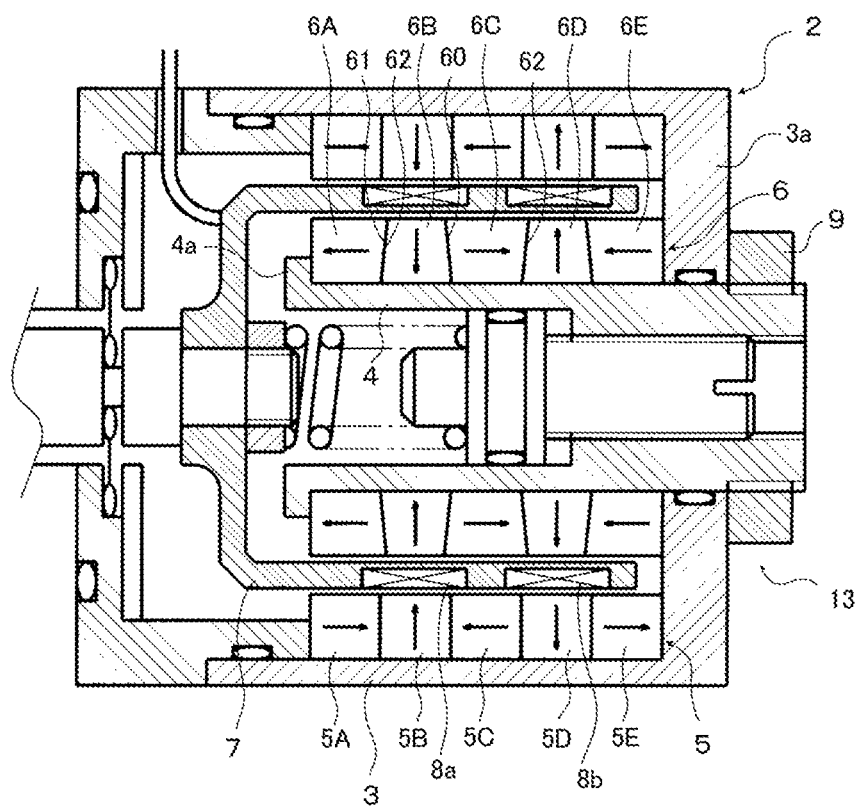
FIG. 5 is a cross-sectional view of a voice coil motor according to a second embodiment.

FIG. 5 shows a second embodiment of a voice coil motor according to the present invention. The same reference signs are used for denoting the same parts or the corresponding parts of the first embodiment in order to omit a repeated explanation.

In this embodiment, each of the radially magnetized magnets (split magnets) 6B and 6D of the inner magnet array 6 has a trapezoidal shape in which the upper base is shorter than the bottom base in its cross section, in the same way as the first embodiment, whereas each of the ring-shaped axially magnetized magnets 6A, 6C and 6E has a trapezoidal shape in which the upper base is longer than the bottom base in its cross section. Namely, the split magnets 6B and 6D have the inclined surfaces 60 and 61 at both sides in the axial direction, whereas the axially magnetized magnets 6A, 6C and 6E have tapered surfaces 62 at their axial sides opposing the inclined surfaces 60 and 61. In this case also, in the same way as the first embodiment, the split magnets 6B and 6D are prevented from popping outwardly because the split magnets 6B and 6D are biased inwardly in the radial direction due to the clamping force of the fastener (nut) 9. Further, the wedge-shaped ring 12 which was used in the first embodiment is not necessary in this embodiment, thereby the number of components required for the inner magnet array 6 can be reduced.

The Third Embodiment

Figure 6:
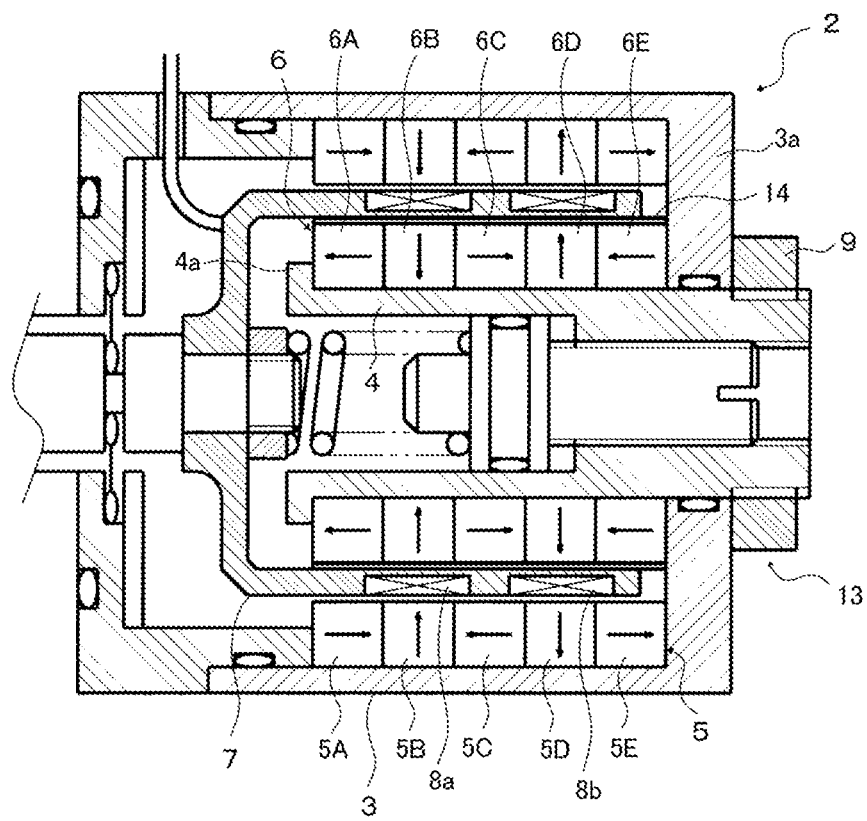
FIG. 6 is a cross-sectional view of a voice coil motor according to a third embodiment.
Figure 7:
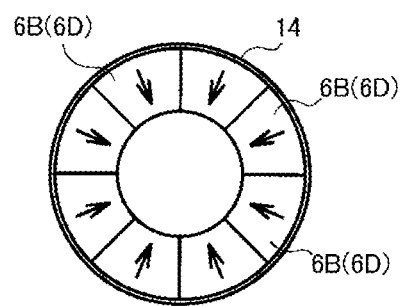
FIG. 7 is a cross-sectional view seen from an axial direction of a radially magnetized magnet of an inner magnet array of a voice coil motor shown in FIG. 6.

FIGS. 6 and 7 show a third embodiment of a voice coil motor according to the present invention. The same reference signs are used for denoting the same parts or the corresponding parts of the first embodiment in order to omit a repeated explanation. In this embodiment, after a plurality of the split magnets 6B and 6D radially magnetized are assembled into a ring-shape, the outer periphery thereof is surrounded by a thin non-magnetic tube 14. In this case, the cross-sections of the radially magnetized magnets (split magnets) 6B and 6D as well as the axially magnetized magnets 6A, 6C and 6E need not to be trapezoids, namely, they may be typical rectangular.

By this configuration, the split magnets composing the radially magnetized magnets 6B and 6D of the inner magnet array 6 can be prevented from popping outwardly effectively. Because the tube 14 is made of a non-magnetic material, the magnetic field generated by the radially magnetized magnets 6B and 6D as well as the axially magnetized magnets 6A, 6C and 6E will not be disturbed. Further, if the tube 14 has an inward contraction force in radial direction, misalignment of the split magnets caused by e.g. changes in temperature or vibration can be prevented more securely. It is preferable that the tube 14 is formed as thin as possible, and made of a material freely slidable along the bobbin 7.

The Fourth Embodiment

Figure 8:
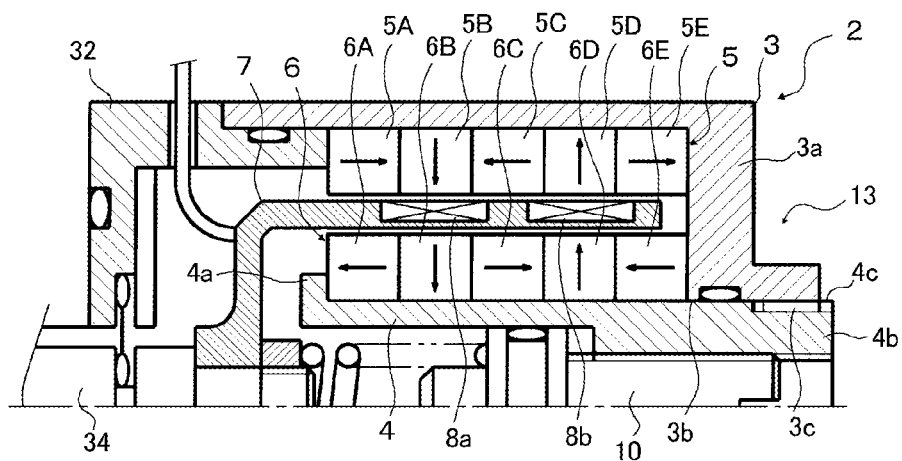
FIG. 8 is a half sectional view of the voice coil motor according to a fourth embodiment.

FIG. 8 shows a fourth embodiment of a voice coil motor according to the present invention. The same reference signs are used for denoting the same parts or the corresponding parts of the first embodiment in order to omit a repeated explanation. In this embodiment, a fixing means 13 includes a side member 3a having an internal thread 3c on an inner periphery of a through hole 3b thereof, and an inner cylindrical member 4 having an external thread 4c, such that the inner magnet array 6 is fixedly clamped in the axial direction due to the engagement of the external thread 4c of the inner cylindrical member 4 with the internal thread 3c of a side member 3a. In this case, the side member 3a serves as a fastener as well.

In FIG. 8, the cross-sections of the radially magnetized magnets (split magnets) 6B and 6D as well as the axially magnetized magnets 6A, 6C and 6E are rectangular. However, they may be trapezoids as described in the first and second embodiments, or the magnets may be surrounded by a non-magnetic tube 14 as described in the third embodiment.

The Fifth Embodiment

Figure 9:
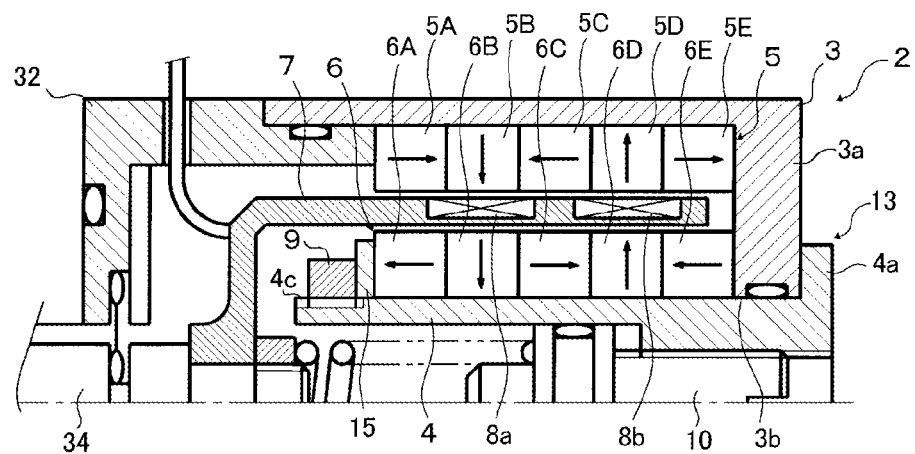
FIG. 9 is a half sectional view of the voice coil motor according to a fifth embodiment.

FIG. 9 shows a fifth embodiment of a voice coil motor according to the present invention. The same reference signs are used for denoting the same parts or the corresponding parts of the first embodiment in order to omit a repeated explanation. In this embodiment, a fixing means 13 includes a flange part 4a formed at the right end portion of the inner cylindrical member 4 and an external thread 4c formed at the left end portion of the inner cylindrical member 4. The inner cylindrical member 4 is inserted into the through hole 3b of the side member 3a from the right-hand side so that the flange part 4a abuts against the right side surface of the side member 3a. Thereafter, an inner magnet array 6 is arranged from the left-hand side onto the outer periphery of the inner cylindrical member 4, and a fastener 9 is engaged with an external thread 4c via a washer 15 such that the inner magnet array 6 is clamped in the axial direction. In this case also, by fastening the fastener 9, the inner magnet array 6 can be fixedly clamped, and the inner cylindrical member 4 can be fixed to the side member 3a simultaneously.

The Sixth Embodiment

Figure 10:
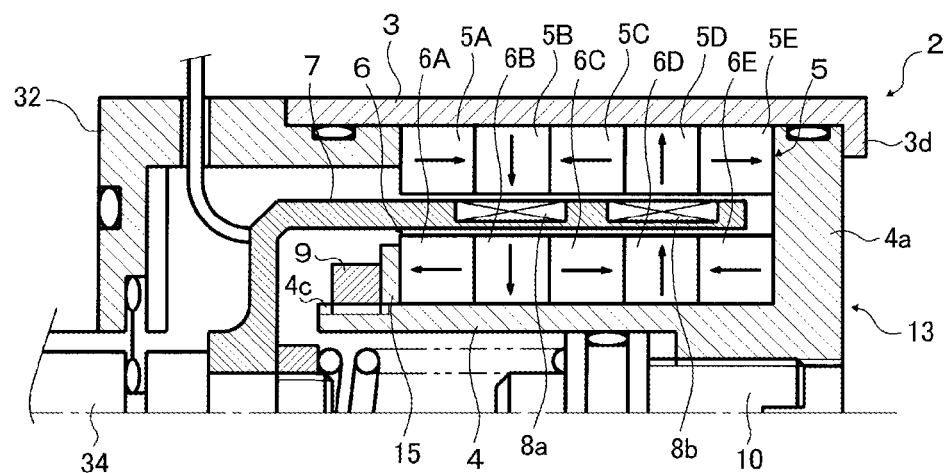
FIG. 10 is a half sectional view of the voice coil motor according to a sixth embodiment.
Figure 11:
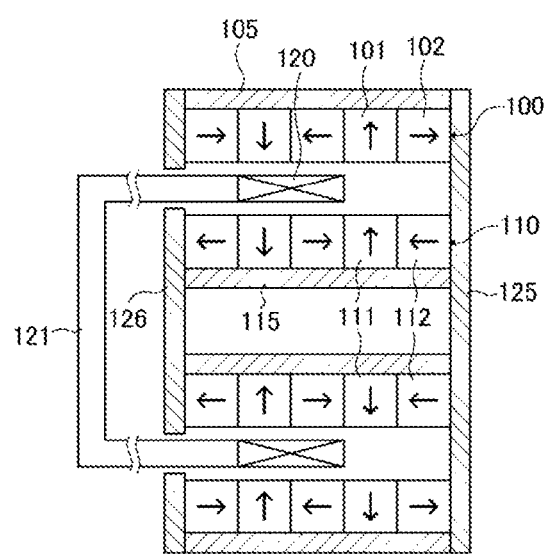
FIG. 11 shows a principle of a voice coil motor using a Dual Halbach Magnet Array.

FIG. 10 shows a sixth embodiment of a voice coil motor according to the present invention. The same reference signs are used for denoting the same parts or the corresponding parts of the first embodiment in order to omit a repeated explanation. In this embodiment, a fixing means 13 includes a flange part 4a which serves as a side member as well, and which is formed at the right end portion of the inner cylindrical member 4, and an external thread 4c formed at the left end portion of the inner cylindrical member 4. First, an inner magnet array 6 is arranged onto the outer periphery of the inner cylindrical member 4, and a fastener 9 is engaged with the external thread 4c via a washer 15 such that the inner magnet array 6 is fixed to the inner cylindrical member 4. Then, by arranging the outer cylindrical member 3 on the outer periphery of the flange part 4a of the inner cylindrical member 4 in such a way that an inward collar 3d of the outer cylindrical member 3 abuts upon the outer side surface of the flange part 4a, an outer cylindrical member 3 is assembled with the inner cylindrical member 4. In this case, because it is possible to fix the inner magnet array 6 to the inner cylindrical member 4 before the outer cylindrical member 3 is assembled with the inner cylindrical member 4, the assembling of the inner cylindrical member 4 with the outer cylindrical member 3 becomes easier.

Other Embodiments

Although the first to the sixth embodiments have been shown as described above, they are merely a few examples, and modifications of this invention are possible within the spirit and scope of the invention. Also, a new embodiment may be implemented by combining the features of the first to the sixth embodiments. For example, the non-magnetic tube 14 shown in FIG. 6 may be applied to the embodiments as described in FIG. 2 or 5.

The "servo valve" in the present invention is a generic term of a valve which controls the fluid pressure or output flow rate in accordance with the electric input signal, and the servo valve can be used in any case of hydraulic pressure, water pressure or air pressure. The servo valve of the present invention is not required to be directly connected to the loading device, and for example, it can be used as a pilot valve for constructing a servo valve of a large flow rate type. For example, the servo valve of the present invention may be configured as a linear solenoid valve. In this case, ports of the valve body are not limited to the configuration as shown in FIG. 1. For example, the valve body may be provided with an outlet port which is located between an input port and a drain port. Further, a feedback port, into which the output pressure is fed back from the outlet port, may be located at one side of the valve body.

Although the coil bobbin 7 of a voice coil motor and the spool 34 are combined mechanically in the above described embodiments, it is possible to employ a spring for urging the coil bobbin against the spool.

In the first to the fifth embodiments, although the fixing means 13 for axially clamping the inner magnet array 6 also serves as a fixing means for fixing the inner cylindrical member 4 to the outer cylindrical member 3 (side member 3a), these fixing means may be realized individually as described in the sixth embodiment. Namely, it is possible to separately provide a fixing means for axially clamping the inner magnet array 6 and a fixing means for fixing the inner cylindrical member 4 to the outer cylindrical member 3.

Although the side member 3a or 4a is integrally formed (or fixed) with the outer cylindrical member 3 or the inner cylindrical member 4 in the above described embodiments, it may be formed separately from the outer cylindrical member 3 or the inner cylindrical member 4.

Further, a spring member such as a spring washer and a plate spring may be deposited e.g. between the fastener 9 and the side member 3a, between the fastener 9 and the inner magnet array 6, or between the flange part 4a and the inner magnet array 6, so as to decrease the influence of a thermal expansion of the inner magnet array 6 due to the temperature changes.

The flange part 4a of the inner cylindrical member 4 is not limited to be formed integrally with the inner cylindrical member 4. Instead, a different member such as a snap ring may be attached on the outer periphery of the inner cylindrical member 4 to serve as a flange part. The inner cylindrical member is not limited to have a cylindrical shape in its entirety, but it may be in a solid shape in part. In the embodiments, the spring-stopping screw 10 engages with the inner periphery of the inner cylindrical member 4 such that the neutral position of the coil bobbin 7, in other words, the neutral position of the spool 34, can be adjusted from outside by the screw 10. However, the screw 10 may be provided depending on the necessity.

The wedge-shaped ring 12 used in the first embodiment can be replaced by a ring member having a certain thickness. In this case, the split magnet may have a step or a groove in the circumferential direction on at least one axial side surface thereof, and a ring member may be fitted into the step or the groove, such that the ring member gets clamped between the split magnet and the axially magnetized magnet by the clamping force of the fixing means. In this case, the split magnets can also be prevented from popping outwardly from the outer periphery by the ring member.

REFERENCE SIGNS

1 Servo valve
2 Voice coil motor
3 Outer cylindrical member
3a Side member
3b Through hole
4 Inner cylindrical member
4a Flange part
4b Axial part
4c External thread
5 Outer magnet array
5A, 5C, 5E Axially magnetized magnets
5B, 5D Radially magnetized magnets
6 Inner magnet array
6A, 6C, 6E Axially magnetized magnets
6B, 6D Radially magnetized magnets (Split magnets)
7 Coil bobbin
8a, 8b Coils
9 Fastener (Nut)
12 Wedge-shaped ring
13 Fixing means
30 Valve body
34 Spool
36 Magnet for detection
38 Hall device for detecting displacement
39 Coil for detecting velocity

The invention claimed is:
1. A voice coil motor comprising:
   an outer magnet array constructed by arranging radially magnetized magnets of ring-shape and axially magnetized magnets of ring-shape to be axially adjacent to each other in a manner that magnetic poles of the radially magnetized magnets and the axially magnetized magnets are altered by substantially 90 degrees in a cross-section including a center axis of the outer magnet array;
   an inner magnet array constructed by arranging radially magnetized magnets of ring-shape and axially magnetized magnets of ring-shape to be axially adjacent to each other, the radially magnetized magnets having magnetic poles which are directed in the same directions as those of the outer magnet array, and the axially magnetized magnets having magnetic poles which are directed in directions opposite to those of the outer magnet array;
   an outer cylindrical member for supporting an outer periphery of the outer magnet array;
   an inner cylindrical member for supporting an inner periphery of the inner magnet array;
   a side member for connecting at least one axial end of the outer cylindrical member and that of the inner cylindrical member; and a coil arranged axially movably in an annular space between the outer magnet array and the inner magnet array to be actuated axially when current is supplied to the coil, wherein each of the axially magnetized magnets of the inner magnet array is formed of a monolithic magnet having ring-shape, wherein each of the radially magnetized magnets of the inner magnet array is formed of a plurality of split magnets divided in a circumferential direction, wherein a fixing means is provided to fix the radially magnetized magnets and the axially magnetized magnets of the inner magnet array in an axially clamped manner, and wherein the voice coil motor further comprises a non-magnetic tube which continuously surrounds outer peripheries of the radially magnetized magnets and the axially magnetized magnets of the inner magnet array.

2. The voice coil motor according to claim 1,
wherein inclined surfaces are formed on at least one axial side of the split magnets,
wherein a wedge-shaped ring having a larger thickness at its outer peripheral portion than that at its inner peripheral portion is positioned between the inclined surfaces of the split magnets and an opposing surface of one of the axially magnetized magnets, and
wherein the split magnets are biased inwardly in a radial direction due to an axial clamping force of the fixing means.

3. The voice coil motor according to claim 1,
wherein inclined surfaces are formed on at least one axial side of the split magnets,
wherein a tapered surface with an inclination corresponding to the inclined surfaces is formed on an opposing surface of one of the axially magnetized magnets contacting with the inclined surfaces of the split magnets, and
wherein the split magnets are biased inwardly in a radial direction due to an axial clamping force of the fixing means.

4. The voice coil motor according to claim 1,
wherein the outer cylindrical member, the inner cylindrical member and the side member are formed of magnetic material respectively, and
wherein a continuous magnetic path from the outer cylindrical member to the inner cylindrical member via the side member is formed.

5. A direct-acting servo valve comprising:
a voice coil motor according to claim 1,
a valve body having a plurality of ports, and
a spool positioned in the valve body movably in an axial direction,
wherein the spool is axially driven by the voice coil motor to switch the connection path between the ports.

6. The direct-acting servo valve according to claim 5,
wherein a detection magnet is fixed on an axial end of the spool, and
wherein a hall device and a coil element for detecting displacement and velocity of the spool are located at a stationary position in the vicinity of the detection magnet to output detected signals as a feedback signal.

7. A voice coil motor comprising:
an outer magnet array constructed by arranging radially magnetized magnets of ring-shape and axially magnetized magnets of ring-shape to be axially adjacent to each other in a manner that magnetic poles of the radially magnetized magnets and the axially magnetized magnets are altered by substantially 90 degrees in a cross-section including a center axis of the outer magnet array;

an inner magnet array constructed by arranging radially magnetized magnets of ring-shape and axially magnetized magnets of ring-shape to be axially adjacent to each other, the radially magnetized magnets having magnetic poles which are directed in the same directions as those of the outer magnet array, and the axially magnetized magnets having magnetic poles which are directed in directions opposite to those of the outer magnet array;

an outer cylindrical member for supporting an outer periphery of the outer magnet array;

an inner cylindrical member for supporting an inner periphery of the inner magnet array;

a side member for connecting at least one axial end of the outer cylindrical member and that of the inner cylindrical member; and a coil arranged axially movably in an annular space between the outer magnet array and the inner magnet array to be actuated axially when current is supplied to the coil, wherein each of the axially magnetized magnets of the inner magnet array is formed of a monolithic magnet having ring-shape, wherein each of the radially magnetized magnets of the inner magnet array is formed of a plurality of split magnets divided in a circumferential direction, wherein a fixing means is provided to fix the radially magnetized magnets and the axially magnetized magnets of the inner magnet array in an axially clamped manner, and wherein the fixing means comprises;
a flange part provided on an axial end portion of the inner cylindrical member to stop an axial end of the inner magnet array,
a threaded portion formed on the other axial end portion of the inner cylindrical member, and
a threaded fastener engaged with the threaded portion for pressing the other axial end of the inner magnet array, wherein the inner magnet array is axially clamped between the flange part and the threaded fastener.

8. The voice coil motor according to claim 7,
wherein inclined surfaces are formed on at least one axial side of the split magnets,
wherein a wedge-shaped ring having a larger thickness at its outer peripheral portion than that at its inner peripheral portion is positioned between the inclined surfaces of the split magnets and an opposing surface of one of the axially magnetized magnets, and
wherein the split magnets are biased inwardly in a radial direction due to an axial clamping force of the fixing means.

9. The voice coil motor according to claim 7,
wherein inclined surfaces are formed on at least one axial side of the split magnets,
wherein a tapered surface with an inclination corresponding to the inclined surfaces is formed on an opposing surface of one of the axially magnetized magnets contacting with the inclined surfaces of the split magnets, and
wherein the split magnets are biased inwardly in a radial direction due to an axial clamping force of the fixing means.

10. The voice coil motor according to claim 7,
wherein the outer cylindrical member, the inner cylindrical member and the side member are formed of magnetic material respectively, and
wherein a continuous magnetic path from the outer cylindrical member to the inner cylindrical member via the side member is formed.

11. A direct-acting servo valve comprising:
a voice coil motor according to claim 7,
a valve body having a plurality of ports, and
a spool positioned in the valve body movably in an axial direction,
wherein the spool is axially driven by the voice coil motor to switch the connection path between the ports.

12. The direct-acting servo valve according to claim 11,
wherein a detection magnet is fixed on an axial end of the spool, and
wherein a hall device and a coil element for detecting displacement and velocity of the spool are located at a stationary position in the vicinity of the detection magnet to output detected signals as a feedback signal.

13. A voice coil motor comprising:
an outer magnet array constructed by arranging radially magnetized magnets of ring-shape and axially magnetized magnets of ring-shape to be axially adjacent to each other in a manner that magnetic poles of the radially magnetized magnets and the axially magnetized magnets are altered by substantially 90 degrees in a cross-section including a center axis of the outer magnet array;
an inner magnet array constructed by arranging radially magnetized magnets of ring-shape and axially magnetized magnets of ring-shape to be axially adjacent to each other, the radially magnetized magnets having magnetic poles which are directed in the same directions as those of the outer magnet array, and the axially magnetized magnets having magnetic poles which are directed in directions opposite to those of the outer magnet array;
an outer cylindrical member for supporting an outer periphery of the outer magnet array;
an inner cylindrical member for supporting an inner periphery of the inner magnet array;
a side member for connecting at least one axial end of the outer cylindrical member and that of the inner cylindrical member; and
a coil arranged axially movably in an annular space between the outer magnet array and the inner magnet array to be actuated axially when current is supplied to the coil,
wherein each of the axially magnetized magnets of the inner magnet array is formed of a monolithic magnet having ring-shape,
wherein each of the radially magnetized magnets of the inner magnet array is formed of a plurality of split magnets divided in a circumferential direction,
wherein a fixing means is provided to fix the radially magnetized magnets and the axially magnetized magnets of the inner magnet array in an axially clamped manner, and
wherein the fixing means comprises;
a flange part provided on an axial end portion of the inner cylindrical member to stop the axial end of the inner magnet array,
a shank portion having external thread on the other axial end of the inner cylindrical member,
a through hole formed in the side member to be inserted by the shank portion, and
a threaded fastener engaged with the external thread of the shank portion, wherein the inner magnet array and the side member are axially clamped between the flange part and the threaded fastener.

14. The voice coil motor according to claim 13,
wherein inclined surfaces are formed on at least one axial side of the split magnets,
wherein a wedge-shaped ring having a larger thickness at its outer peripheral portion than that at its inner peripheral portion is positioned between the inclined surfaces of the split magnets and an opposing surface of one of the axially magnetized magnets, and
wherein the split magnets are biased inwardly in a radial direction due to an axial clamping force of the fixing means.

15. The voice coil motor according to claim 13,
wherein inclined surfaces are formed on at least one axial side of the split magnets,
wherein a tapered surface with an inclination corresponding to the inclined surfaces is formed on an opposing surface of one of the axially magnetized magnets contacting with the inclined surfaces of the split magnets, and
wherein the split magnets are biased inwardly in a radial direction due to an axial clamping force of the fixing means.

16. The voice coil motor according to claim 13,
wherein the outer cylindrical member, the inner cylindrical member and the side member are formed of magnetic material respectively, and
wherein a continuous magnetic path from the outer cylindrical member to the inner cylindrical member via the side member is formed.

17. A direct-acting servo valve comprising:
a voice coil motor according to claim 13,
a valve body having a plurality of ports, and
a spool positioned in the valve body movably in an axial direction,
wherein the spool is axially driven by the voice coil motor to switch the connection path between the ports.

18. The direct-acting servo valve according to claim 17,
wherein a detection magnet is fixed on an axial end of the spool, and
wherein a hall device and a coil element for detecting displacement and velocity of the spool are located at a stationary position in the vicinity of the detection magnet to output detected signals as a feedback signal.

* * * * *